United States Patent [19]
Roach, Jr.

[11] Patent Number: 6,044,265
[45] Date of Patent: *Mar. 28, 2000

[54] METHODS AND APPARATUS FOR CELLULAR SET PROGRAMMING

[75] Inventor: Peter O. Roach, Jr., Doraville, Ga.

[73] Assignee: BellSouth Corporation, Atlanta, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 08/465,418

[22] Filed: Jun. 5, 1995

[51] Int. Cl.⁷ ...................................................... H04Q 7/20

[52] U.S. Cl. .......................... 455/419; 455/432; 455/435; 455/436; 455/517; 455/552

[58] Field of Search .................................. 379/58, 59, 60, 379/62, 63; 455/33.1, 33.2, 54.1, 54.2, 418, 419, 422, 424, 425, 432, 435, 436, 515, 517, 552, 560, 461, 466, 414

[56] References Cited

U.S. PATENT DOCUMENTS

| | | |
|---|---|---|
| 4,750,197 | 6/1988 | Denekamp et al. . |
| 4,833,701 | 5/1989 | Comroe et al. . |
| 4,901,340 | 2/1990 | Parker et al. . |
| 4,905,302 | 2/1990 | Childress et al. . |
| 4,914,651 | 4/1990 | Lusignan . |

(List continued on next page.)

FOREIGN PATENT DOCUMENTS

| | | |
|---|---|---|
| 0 417 944 A2 | 3/1991 | European Pat. Off. . |
| 0 484 918 A2 | 5/1992 | European Pat. Off. . |
| 0 497 203 A2 | 8/1992 | European Pat. Off. . |
| 0 521 610 A2 | 1/1993 | European Pat. Off. . |
| WO 89/12835 | 12/1989 | WIPO . |
| WO 92/13284 | 8/1992 | WIPO . |
| WO 93/13618 | 7/1993 | WIPO . |
| WO94/08432 | 4/1994 | WIPO . |
| WO 96/39787 | 12/1996 | WIPO . |

OTHER PUBLICATIONS

Bogut, et al. "Scanning Locator System, "*Motorola, Inc. Technical Developments,* volume 12, pp. 5–7 (Apr. 1991).

Courau and Minet, "Implementation of Broadcast and Personal Message Services in an Experimental Mobile Radio System," *International Conference on Digital Land Mobile Radio Communications,* pp. 144–151, Venice, Italy (Jun. 30, 1987–Apr. 3, 1987).

International Search Report in PCT/US96/08942 mailed Dec. 5, 1996.

European Telecommunications Standard—Draft pr ETS 300 537, "European Digital Cellular Telecommunications System (Phase 2); Technical Realization of Short Message Service Call Broadcast (SMSCB)", European Telecommunications Standards Institute, Oct. 1993.

(List continued on next page.)

*Primary Examiner*—Dwayne D. Bost
*Assistant Examiner*—Nay Maung
*Attorney, Agent, or Firm*—John S. Pratt; Kilpatrick Stockton LLP

[57] ABSTRACT

A method for programming a cellular set over a control channel may be used to update data stored within a cellular set by having the cellular set search the control channel for data updates that are broadcast over the control channel upon command of a controller coupled to the wireless system. In one embodiment, the method updates a carrier list of system identification numbers ("SIDs"). A cellular set searches the control channel for a unique identifier that is followed by the current carrier list number. The cellular set compares the current carrier list number with a stored carrier list number. If the carrier list numbers do not match, the cellular set stores the current carrier list number in memory and enters an acquisition mode in which it continuously monitors the control channel for updated data, possibly in the form of SIDs to add or remove from the list. The cellular set is programmed to recognize the updated data and retrieve it into memory.

34 Claims, 4 Drawing Sheets

U.S. PATENT DOCUMENTS

| | | | |
|---|---|---|---|
| 4,916,728 | 4/1990 | Blair . | |
| 4,939,746 | 7/1990 | Childress . | |
| 4,969,205 | 11/1990 | Itoh . | |
| 4,989,230 | 1/1991 | Gillig et al. . | |
| 5,008,925 | 4/1991 | Pireh . | |
| 5,020,091 | 5/1991 | Krolopp et al. . | |
| 5,046,082 | 9/1991 | Zicker et al. . | |
| 5,046,530 | 9/1991 | Hall et al. . | |
| 5,095,530 | 3/1992 | Tanaka et al. . | |
| 5,125,102 | 6/1992 | Childress et al. . | |
| 5,127,042 | 6/1992 | Gillig et al. . | |
| 5,140,302 | 8/1992 | Tanaka . | |
| 5,142,654 | 8/1992 | Sonberg et al. . | |
| 5,159,625 | 10/1992 | Zicker | 379/59 |
| 5,235,598 | 8/1993 | Sasuta . | |
| 5,235,633 | 8/1993 | Dennison et al. . | |
| 5,239,294 | 8/1993 | Flanders et al. . | |
| 5,239,678 | 8/1993 | Grube et al. | 455/34.1 |
| 5,247,564 | 9/1993 | Zicker . | |
| 5,255,307 | 10/1993 | Mizikovsky . | |
| 5,295,064 | 3/1994 | Malec et al. | 364/401 |
| 5,297,192 | 3/1994 | Gerszberg . | |
| 5,307,400 | 4/1994 | Sawyer et al. . | |
| 5,307,509 | 4/1994 | Michalon et al. . | |
| 5,327,144 | 7/1994 | Stilp et al. . | |
| 5,341,410 | 8/1994 | Aron et al. . | |
| 5,353,332 | 10/1994 | Raith et al. . | |
| 5,404,355 | 4/1995 | Raith . | |
| 5,442,809 | 8/1995 | Diaz et al. . | |
| 5,454,027 | 9/1995 | Kennedy et al. | 379/60 |
| 5,467,353 | 11/1995 | Fukuda . | |
| 5,475,862 | 12/1995 | Sawyer | 455/33.1 |
| 5,515,419 | 5/1996 | Scheffer . | |
| 5,521,925 | 5/1996 | Merakos et al. . | |
| 5,524,135 | 6/1996 | Mizikovsky et al. | 455/419 |
| 5,526,401 | 6/1996 | Roach, Jr. et al. . | |
| 5,530,736 | 6/1996 | Comer et al. . | |
| 5,539,810 | 7/1996 | Kennedy, III et al. . | |
| 5,544,225 | 8/1996 | Kennedy, III et al. | 455/461 |
| 5,546,444 | 8/1996 | Roach, Jr. et al. | 455/466 |
| 5,546,445 | 8/1996 | Dennison et al. . | |
| 5,551,058 | 8/1996 | Hutcheson et al. . | |
| 5,579,376 | 11/1996 | Kennedy, III et al. . | |
| 5,594,740 | 1/1997 | LaDue . | |
| 5,600,706 | 2/1997 | Dunn et al. . | |
| 5,608,410 | 3/1997 | Stilp et al. . | |
| 5,613,204 | 3/1997 | Haberman et al. | 455/432 |
| 5,613,213 | 3/1997 | Naddell et al. | 455/414 |
| 5,761,618 | 6/1998 | Lynch et al. | 455/419 |
| 5,790,952 | 8/1998 | Seaholtz et al. | 455/552 |
| 5,794,141 | 8/1998 | Zicker | 455/419 |

OTHER PUBLICATIONS

European Telecommunications Standard—Draft pr ETS 300 536, "European Digital Cellular Telecommunications System (Phase 2); Technical Realization of short Message Service (SMS) Point to Point (PP)", European Telecommunications Standards Institute, Oct. 1993.

The GSM System for Mobile Communications, Michel Mouly and Marie–Bernadette Pautet, ISBN: 2–9507190–0–7, © 1992, pp. 56–59.

Application Serial No. 08/212,039.

Application Serial No. 08/331,794.

METHODS AND APPARATUS FOR CELLULAR SET PROGRAMMING

The present invention relates to methods and apparatus for broadcasting data and programming instructions over the air to a programmable cellular set.

BACKGROUND OF THE INVENTION

Cellular sets used in wireless communication systems such as cellular networks, personal communication systems and the like typically contain a number of parameters that are programmed when the cellular set is manufactured, a user purchases it and it is activated, or a user changes service providers. For example, programming parameters may include the Mobile Identification Number ("MIN") assigned to the cellular set, or the System Identification Number ("SID") of the wireless system from which the user is obtaining communication services. Within a particular geographic area, cellular sets are typically programmed to operate on one of two frequency bands, generally denominated A or B, each of which has signalling control, voice and paging channels. By regulation designed to foster competition, operators of wireless systems, or carriers, service only a single frequency band in any particular area. Typically, nonwireline carriers are granted the A frequency band while wireline carriers are granted the B frequency band; these assignments are not necessarily permanent, however. Accordingly, the user of the cellular set may have a "home" carrier, from which the user purchased communication services, which operates the A frequency band in the user's home service area, but operates the B frequency band in a second service area. Thus, in different service areas, the same carrier may (and typically does) operate wireless systems on different frequency bands.

A cellular set may be programmed to prefer operation on either the A or B frequency band. Usually the frequency band chosen is the one that the "home" carrier operates in the particular geographic area in which the cellular set was purchased. For instance, if a mobile user purchases a cellular set and associated services from a "home" carrier located in Atlanta, Ga. and operating a wireless system on the B frequency band, the cellular set will be programmed to prefer the B frequency band. If, however, the mobile user travels to Los Angeles, Calif., where the home carrier operates a wireless system on the A frequency band, the cellular set will continue to prefer the B frequency band and the user may not be served by the home carrier. This leads to increased service charges for the user since the operator of the B frequency band in the Los Angeles area may not be associated with the user's home carrier and likely charges higher rates for providing service to a visiting or "roaming" customer. Thus, it is desirable to have the cellular set select whichever frequency band the home carrier of the user may operate in a particular geographic area. Furthermore, if the mobile user of the cellular set roams into an area that its home carrier does not at all service, it is at least desirable to program the cellular set to select a frequency of a foreign carrier with which the home carrier is associated or has negotiated to obtain lower service charges when the mobile user is serviced by the foreign carrier.

These selection functions may be accomplished by providing a cellular set with a list of System Identification Numbers ("SIDs") that identify carriers. The list can be negative (preventing use of listed carriers) or positive (allowing use of listed carriers). Methods for using these lists to select a preferred frequency are disclosed in U.S. Pat. Nos. 4,916,723 to Blair and 5,020,091 to Krolopp, et al. Krolopp, et al. discloses "a process for determining in which system the radio telephone is located and allowing the users to decide whether that number should be used. The process starts with the radio telephone scanning the frequencies assigned to the system in which it is located to find the control channels and determine the system identification code. The received system identification code is then compared with the system identification codes stored in memory in the radio telephone." Through this process, "a radio telephone with multiple set telephone numbers can be used in other cellular systems without requiring the user to memorize or look up which telephone number is used in a particular system." Similarly, Blair discloses a cellular telephone "programmed to scan the available cellular frequencies in search of a home SID carrier signal or alternatively for a carrier signal associated with a SID that is not on an exclusion list, and to indicate the availability of carrier signals on a status display."

Generally, a list or table of SIDs is stored in the memory of a cellular set when it is manufactured and/or activated. During the life of the cellular set, the validity of the foreign wireless systems identified in the cellular set may change, and hence, the list of SIDs corresponding to preferred foreign wireless systems may also need to be changed. Updating or changing the list of SIDs or other programmable parameters within the cellular set is inconvenient, requiring the user to either reprogram the cellular set with the proper parameters herself or (more typically) remove the cellular set and return it to a service center for reprogramming. These options involve substantial labor and inconvenience.

However, a method of updating the data (including the list of SIDs) stored within a cellular mobile radio telephone memory is disclosed in U.S. Pat. Nos. 5,159,625 to Zicker, et al. and 5,046,082 to Zicker, et al. (the "'082 patent"). The '082 patent discloses "a remotely accessible cellular telephone (RACT) which includes operational data stored therein." A method is also disclosed for "detecting the occurrence of an incoming call and answering the incoming call. In another step the call is monitored to detect and identify a signal, and to provide external access to the operational data only if the identifying signal is detected." Another method disclosed in the '082 patent "calls for storing a phone number which corresponds to an administration system and storing a specified call-in time. The method maintains continually updated data which defines a then-current date and time. When the call-in time occurs, the present invention automatically dials the phone number to establish data communication with the data administrative system. A subsequent step then allows the administration system to access the operational data."

While the remote programming method disclosed in the '082 patent is viable, it requires direct communication between the administration system and each RACT. In order to use the method, it is necessary to complete a voice call from the system to the cellular phone and hold the call while reprogramming the phone. As is noted in applicant's U.S. Pat. Nos. 5,526,401 and 5,546,444 both of which are hereby incorporated in their entireties by this reference, this is expensive since the user (or the carrier) must pay for the more expensive voice channel air time used during programming sessions.

Additionally, a wireless system using the method disclosed in the '082 patent must deal with a substantial increase in traffic in the event that reprogramming is necessary on a frequent basis, as is the case in updating lists of SIDs for the cellular sets of numerous customers. Furthermore, the method described in the '082 patent requires that the RP host (computer system) individually contact and update each RACT, a time consuming and burdensome operation that decreases valuable system voice channel capacity. Accordingly, there remains a need for remotely reprogramming or sending data updates (including programming instructions) simultaneously to multiple cellular sets without completing a full call. When the data updates include new SIDs to add to memory, the user of the cellular set can then be assured that it will automatically select the frequency associated with the user's home carrier or an associated carrier. Thus, the user is assured of lower costs because roaming charges are eliminated or reduced, and the carrier's costs decrease as well, since valuable voice channel capacity is conserved.

SUMMARY OF THE INVENTION

The present invention includes a method for programming or sending data to a programmable cellular set via the control channel of a wireless system that uses a controller, coupled to the main switch of the wireless system, that may initiate transmission of data or programming instructions by dialing an unassigned telephone number. A portion of the unassigned telephone number (which the cellular sets are programmed to recognize) informs all receiving cellular sets that updated data or programming instructions are part of the telephone number. The main switch of the wireless system pages or broadcasts the unassigned telephone number to all of the cells in the wireless system, which in turn page the unassigned telephone number over their control channels. No modification to already deployed wireless systems is necessary because the wireless systems will functions as if the controller, by dialing the unassigned telephone number, is attempting a normal communication with a particular (but in this case nonexistent) cellular set. Thus, while transparent to the wireless system, the programming instructions or data updates are readily recognized and retrieved by the cellular sets, whose operational data or programming are thereby efficiently refreshed with new information.

The programming method can be used to keep current operational data stored within a programmable cellular set. A stored version code that indicates the version of the operational data stored in memory may be compared with a new version code that is broadcast over the forward control channel and retrieved by the cellular set. An identifier that precedes the new version code allows the cellular set to recognize that the data in a record field immediately following the identifier comprises the new version code that must be retrieved. (Together the identifier and new version code make up a first, unassigned telephone number that is broadcast through the wireless system on command of the controller). The cellular set performs a comparison of the new and stored version codes; if they do not match, the cellular set enters an acquisition mode.

Alternatively, the cellular set may be programmed to enter acquisition mode under a variety of triggers. For example, such triggers may occur: only if the cellular set is located in the "home" system; if the cellular set is located in the home system and the first and second version codes do not match; if a certain time period expires; or if the cellular set recognizes and retrieves data that triggers the acquisition mode. In any event, while in acquisition mode the cellular set scans the forward control channel for a data frame comprising an identifier and a record field that carries data updates instead of a telephone number or MIN. If the acquisition mode is triggered by the retrieval of another command or the comparison of the first and second version codes, the data frame will comprise a second unassigned telephone number having a second identifier distinct from the first and another record field for carrying data updates. Again, the second identifier allows the cellular set to recognize that the information following it will be a data update that the cellular set must retrieve, process and/or store. By keeping the second identifier constant while changing the data within the record field, significant amounts of data or programming instructions can be broadcast to all of the cellular sets operating within the wireless system.

In one embodiment, for example, the cellular set may be provided with a carrier list of SIDs (the operational data) and, optionally, with a stored carrier list number (the stored version code) identifying the version of the carrier list stored in memory. The cellular set is programmed to scan the forward control channel of the wireless system for a current carrier list number (the new version code) that identifies the most current version of the carrier list in use by the wireless system and for one or more SIDs (the data updates) to be added to the carrier list stored within the cellular set.

A first and second unassigned NPA are respectively followed by the current carrier list number and a SID, each of which follow their respective unassigned NPAs in the space that is normally reserved for the MIN of a cellular set. (NPA stands for "Numbering Plan Area" and refers to the normal format of telephone numbers, which is generally "NPA-XXX-XXXX"). The cellular sets are programmed to recognize the unassigned NPAs and retrieve the data following them. Thus, if a cellular set detects the NPA that precedes the current carrier list number, it retrieves the current carrier list number and compares it with the stored carrier list number in its memory. A match indicates the cellular set is operating with the most current list of SIDs and needs no updating. If the current and stored carrier list numbers are different, the cellular set updates its memory with the current carrier list number and is triggered into the acquisition mode in which it scans the control channel for the SIDs to be added to the list; the SIDs are preceded and identified by a second, unassigned NPA. The second, unassigned NPA and new SIDs for the cellular set are also sent via the controller to the main switch. A designation code may follow the new SIDs to inform the cellular set to add or remove the SID to a positive or negative carrier list.

The controller may be a computer or microprocessor system programmed to control the timing and method of initiating a broadcast of SIDs throughout the service area of the wireless system to the cellular sets. For instance, to minimize interference to normal operations on the control channel, the controller could send out data updates such as carrier loyal information only when the traffic on the wireless system was relatively low, either by monitoring traffic on the wireless system or by sending out data at a preselected time period. The cellular set would be programmed to look for data updates only within that period. Typically, the selected time period will be the early morning hours when call traffic on the wireless system is normally at a low level. Transmission during off-peak usage times for the wireless system minimizes interference to the control operations conducted over the control channel. The controller optionally sends only positive or negative carrier lists and SIDs depending on the programming of the cellular sets.

The present invention, by making use merely of the control channel and simultaneously broadcasting one message to many cellular sets, thus avoids the necessity of initiating numerous voice calls to update numerous cellular sets with the newest carrier list or other information. Further, the method of the present invention can be deployed over existing wireless systems since the present invention takes advantage of the operating characteristics of existing wireless systems in efficiently broadcasting data updates or programming instructions to a large number of cellular sets, thus allowing reprogramming of multiple cellular sets with no customer intervention. This method takes advantage of the installed base of communications equipment in a wireless system by using the control channel for data communications between a central location and numerous remote sites. Thus, the valuable frequency spectrum allocated for the voice channels that support normal telephone or other communications on the wireless system is conserved.

It is therefore an object of the present invention to provide methods for sending data or programming instructions efficiently to a cellular set.

It is yet another object of the present invention to provide processes for updating the carrier list stored within a number of cellular sets through use of the control channel of a wireless system to broadcast carrier list updates to the cellular sets.

It is a further object of the present invention to program cellular sets through utilization of the control channel.

It is another object of the present invention to program cellular sets to select a frequency associated with its home carrier and thereby obtain the rates and services provided by the home carrier.

It is an additional object of the present invention to provide programmable cellular sets for use with wireless systems coupled to controllers.

Other objects, features and advantages of the present invention will become apparent with reference to the remainder of this document.

DETAILED DESCRIPTION OF THE DRAWINGS

With reference to the figures, the present invention may be implemented by using unassigned telephone numbers to send data updates to a specially programmed cellular set. Normally, when an NPA is assigned to a particular cellular set, it has the Mobile Identification Number ("MIN") of the cellular set in the "XXX-XXXX" field of a telephone number. When a caller attempts to reach the user of the cellular set he dials its assigned telephone number. The MSC instructs all cells to page the MIN of the cellular set over the forward overhead control channel ("FOCC"). The cellular set is programmed to scan the FOCC of the wireless system for its own MIN. The cellular set of the present invention additionally scans the FOCC for telephone numbers beginning with other, pre-selected NPAs whose XXX-XXXX fields are filled with programming instructions or updated data for SID list management or other functions, rather than the standard MIN. Optionally, a first set of NPA (NPAn) may contain a current list number of the carrier list that currently is in use. A second set of NPA (NPAsys) identifies the SIDs to add to the stored list to bring it current.

A controller coupled to a Mobile Switching Center ("MSC") initiates transmission of the carrier list number or SID simply by dialing, in the format of a telephone number, the NPAn and NPAsys and inserting the carrier list number and SID immediately behind the respective NPAn and NPAsys. Although the sets of NPA transmitted by the controller to the MSC are unassigned and followed by selected data (e.g., an updated carrier list number and SID) rather than the MIN normally associated with telephone numbers, the MSC nevertheless operates as if the sets of NPA were conventional telephone numbers received from a user coupled to the MSC via another wireless system, the Public Switched Telephone Network ("PSTN") or a private network. This therefore allows available wireless systems to implement the present invention without modification.

If the programmable cellular set, while monitoring the control channel, receives a number that begins with NPAn, it compares the current carrier list number that follows NPAn with a stored carrier list number located in the memory. A match indicates that the cellular set has the most current carrier list; otherwise, if the list numbers are different, the cellular set will begin to look for a second set of NPAsys. NPAsys is followed by a SID and, optionally, a designation showing whether the particular SID should be added to a positive or negative carrier list. After retrieving the SID, the cellular set may be programmed to look for a selected number of other SIDs or to continue retrieving SIDs until they are no longer being transmitted.

System Components

Figure 1:
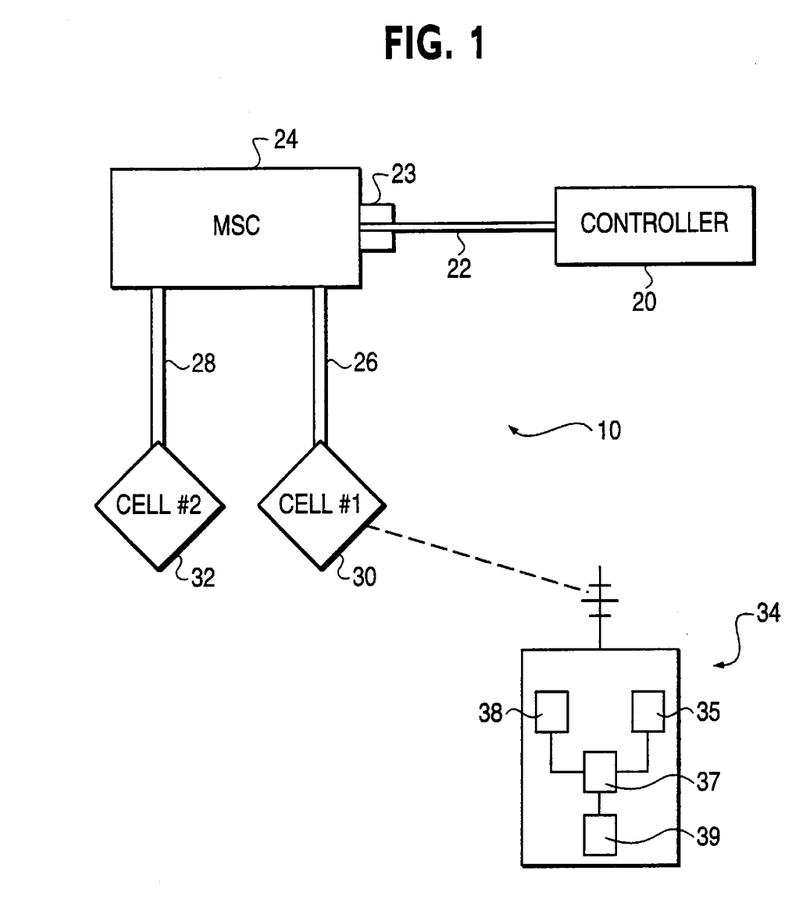
FIG. 1 is a block diagram illustrating a wireless system that utilizes the present invention.

FIG. 1 shows the components of a wireless system 10 according to the present invention. The wireless system 10 may include, for instance, an MSC 24, multiple individual cells 30, 32 and any other components necessary for operating the wireless system 10. Typically, a plurality of such cells 30, 32 are provided within the service area of the wireless system 10. Each of the cells 30, 32 could comprise a "microcell," in which case the cells 30, 32 could be part of a "Personal Communications System" ("PCS") or other similar system. Within each cell is located a transmitter that, after receiving the subscriber's signal, communicates (normally via microwave, the PSTN, or data lines) with an intermediate controller, which in turn communicates with the MSC 24. Alternatively, the cells 30, 32 may communicate directly to the MSC 24. MSC 24 may be eliminated if the network is the Wireless Digital Network disclosed in applicant's co-pending U.S. patent application Ser. No. 08/327,571 and incorporated herein by this reference. In that event, a controller 20 would be coupled to the Central Site Controller ("CSC") within the wireless digital network. The CSC would couple to Intelligent Cellsites ("ICSs") at cells 30, 32 via Integrated Services Digital Network links. The ICSs would then communicate with the cellular set 34.

In any event, cells 30, 32 are provided with a base station having Radio Frequency or RF equipment that generally converts the control messages and voice or data signals from the subscriber to a protocol the MSC 24 understands. The RF equipment communicates with, for instance, a cellular set 34 using any one of the well known cellular network formats, including AMPS, DAMPS, DCS 1800, GSM, IS 95-CDMA, JTACS, TACS, ETACS, RC 2000, NMT 450, ESMR, CT-2, WACS, or NMT 900, or any other applicable format. Generally, therefore, the RF equipment can communicate with any device having control and communication radio channels.

Coupled to the wireless system 10 is a controller 20 that may be a computer system (including a workstation or PC), a microprocessor or even an operations center staffed with appropriate personnel. A first communications link 22, which may be a land line through the Public Switched Telephone Network ("PSTN") or a direct connection to the MSC 24, couples the controller 20 to the MSC 24, which connects to cells 30, 32, respectively, via second communication links 26, 28 that may be dedicated lines or microwave links. Optionally, the first communication link 22 terminates at a dedicated roamer access port 23.

Cellular set 34 may be any cellular communication device that includes a data receiver 35, a processor 37 and a memory unit 39. Optionally a transmitter 38 allows the cellular set 34 to communicate voice or data to the cells 30, 32. The data receiver 35 receives data or programming instructions via a selected radio frequency such as a wireless control channel. The processor 37, which is coupled to the data receiver 35 and the memory unit 39, controls their respective operations to cause the data receiver 35 periodically, at a preselected time or on command, to scan the control channel. Processor 37 is preferably a microprocessor-based control system that can be programmed to conduct control operations in a known manner.

Cellular set 34 is initially provided within its memory unit 39 a carrier list, which phrase generally refers to a list of System Identification Numbers ("SIDs"). The carrier list may be a "positive" list that identifies foreign carriers owned by or associated with the home carrier that normally provides communication services to the user of the cellular set 34. The carrier list may also include other SIDs, including those for systems that the customer prefers to associate with, such as other systems with which the customer has an account. If the SID retrieved by the cellular set 34 is not located on the positive list, the cellular set 34 will not communicate with the carrier identified by the SID. Alternatively, the list may be a negative list of SIDs that prevent the cellular set 34 from operating on frequencies served by the carriers identified by the SIDs on the negative list. Of course, instead of preventing operation, the cellular set 34 may be programmed simply to prefer communication with the carrier identified by a SID listed on a positive list or not identified on a negative list. Additionally, even when the cellular set 34 is programmed to prevent communication with an invalid SID, the user can always override the programming and allow the cellular set 34 to roam.

Figure 2:
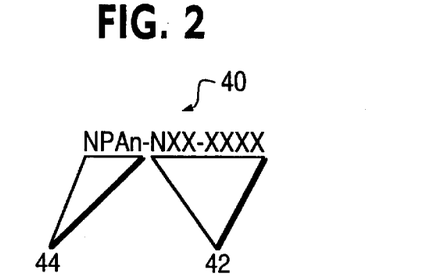
FIG. 2 shows the format of one list identification number used according to the present invention.

Wireless system 10 also requires a set of numbers for list management and a set of numbers to designate valid or invalid SIDs. For example, the wireless system 10 may assign a first data frame 40, e.g., 000-XXX-XXXX, for list management and assign a second data frame 50, e.g., 001-XXX-XXXX, to designate a valid or invalid SID to be added to the positive or negative carrier list located within the cellular set 34. As shown in FIG. 2, the first data frame 40 contains a current carrier list number 42 of the most up-to-date carrier list. NPAn 44 of the first data frame 40 is a first unique identifier that indicates to the cellular set 34 that the data following NPAn 44 is the updated list number 42. Second data frame 50, shown in FIG. 3, contains a NPAsys 52 that is a second unique identifier that informs the cellular set 34 that within the record field ("XXX-XXXX") following NPAsys 52 is data update, such as SID 54, that the cellular set 34 must enter into its memory unit 39. Following SID 54 is instruction 56, which indicates whether the SID 54 should be added to or removed from the stored carrier list in order to update it.

Figure 3:
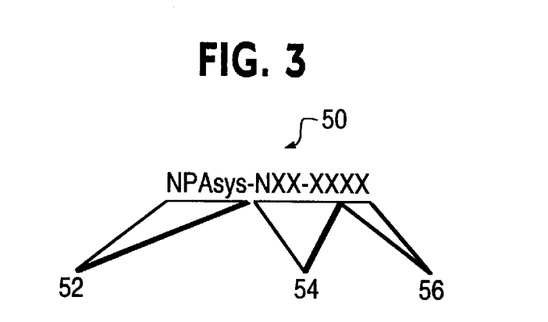
FIG. 3 shows one format according to the present invention of a new SID to be added to a carrier list.

It would, of course, be appropriate to modify the data update in the record field following NPAn 44 or NPAsys 52 to include other programming instructions for implementation by processor 37 or data for storage within the cellular set 34. The record field can be used to carry virtually any data update that will fit within the allotted space of the record field. Preceding the data update with a programming instruction like the current carrier list number 42 is not necessary; it simply prevents cellular set 34 from unnecessarily acquiring SIDs 54 whenever they are broadcast over the wireless system 10. That is, by using current carrier list number 42, the cellular set 34 can compare the current carrier list number 42 with the stored carrier list number and thereby only enter an acquisition mode when the carrier list numbers do not match and it is clear that cellular set 34 does not have a current list of SIDs. This may be a significant benefit, however, since cellular set 34 cannot engage in voice communication and will possibly have a greater battery power consumption while it is acquiring SIDs 54 and updating its carrier list; particularly since the controller 20 may be programmed to send out new SIDs 54 multiple times within a selected time period in order to ensure that all cellular sets 34 receive the SIDs 54 and update their carrier lists.

Broadcasting Data Via Control Channels

The communication links 26, 28 between the cells 30, 32 and the MSC 24 include both voice and control channels. Communications link 36 may use two separate data communication paths, a FOCC for communications initiated by the MSC 24 and a Reverse Control Channel ("RECC") for communications initiated by the cellular set 34. (The data message and radio channel specifications for U.S. wireless systems are set forth in Electronic Industries Association/Telecommunications Industry Association (EIA/TIA) standard 553. Copies of the EIA/TIA-553 may be obtained from the engineering department of Electronic Industries Association at 2001 Pennsylvania Avenue, N.W., Washington, D.C., U.S.A. 20006).

Figure 4:
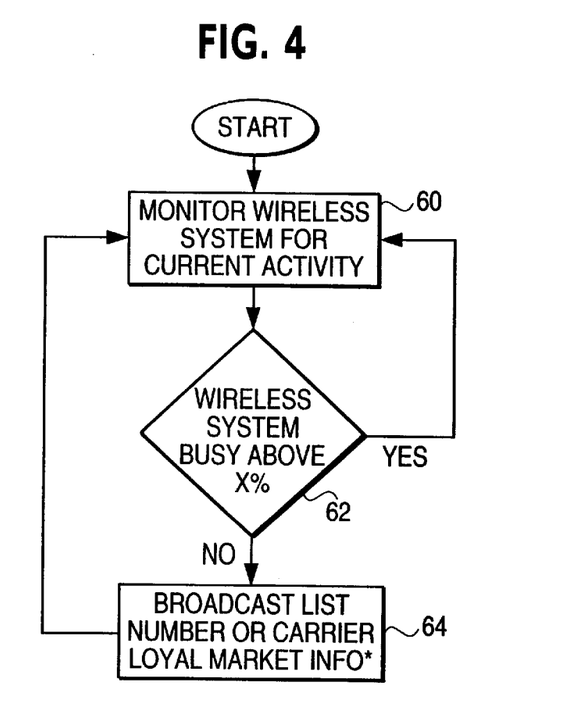
FIG. 4 is a flowchart showing, in block fashion, one process according to the present invention for determining when to broadcast a carrier list.

FIG. 4 describes the steps for broadcasting the carrier list. Before initiating broadcast, the controller 20 may monitor the wireless system 10 to determine its load, as shown in monitoring step 60. This monitoring can be accomplished by having the controller 20 monitor the traffic on wireless system 10 by, for instance, coupling the controller 20 with an operations center or directly with the MSC 24. The operations center or MSC 24 periodically generates reports on traffic loads within the wireless system 10. Upon learning the traffic load of the wireless system 10, a compare step 62 compares the current traffic load obtained by monitoring step 60 with a preselected traffic load threshold. If the reported traffic load exceeds the threshold, then monitoring step 60 continues. On the other hand, if the compare step 62 indicates that the traffic load of the wireless system 10 is below the preselected threshold, the controller 20 will perform broadcast step 64 in which the first and second data frames 40, 50 are sent to the MSC 24. In this manner, the MSC 24 outputs the first and second data frames 40, 50 to the cells 30, 32 only when the traffic on wireless system 10 is at or below an acceptable threshold, which minimizes the possibility that the transmission of data and instructions to numerous cellular sets 34 within the wireless system 10 will interfere with normal voice communications involving the cellular sets 34 within the cell. Nevertheless, the controller 20 also can transmit the first and second data frames 40 and 50 without first checking the traffic on wireless system 10.

An alternative for performing the monitoring step 60 and compare step 62 is to program the controller 20 to transmit the data message during a selected time interval, when control signal traffic is normally at a minimal level. To permit this type of automated transmission operation, the controller 20 need only include a clock that measures a time interval and triggers output during the desired time frame.

Following the monitoring step 60 (or an appropriate trigger), the broadcast step 64 can be accomplished by causing the controller 20 to send to the MSC 24 the first and second data frames 40 and 50. Both first and second data frames 40 and 50 will be automatically forwarded by the MSC 24 to cells 30, 32 for broadcast. This broadcasting may be accomplished without modifying the MSC 24. In wireless systems, each cellular set 34 is assigned a different predetermined identifying characteristic, which normally is an NPAn-XXX-XXXX number that represents the MIN of the cellular set 34. When an incoming call to a selected cellular set 34 is received, the MSC 24 collects the incoming digits, and instructs all cells to page them over the FOCC. Typically, the cellular set 34 upon receiving its MIN over the FOCC immediately generates a page response, after which the MSC selects an initial voice channel and informs the cellular set 34 to prepare for voice communication. To the MSC 24, both first and second data frames 40, 50 will appear to be typical telephone numbers dialed by someone attempting to initiate a communication with a selected cellular set 34. MSC 24 will receive the first and second data frames 40, 50 from the controller 20 and forward them via communication links 26, 28 to cells 30, 32 along with a request to broadcast first and second data frames 40, 50 over the control channel of the wireless system 10.

Once the broadcast step 64 begins, the controller 20 may continue to send out second data frames 50 that include different data updates until either a selected number of transmissions have occurred or there are no more updates to transmit. In other words, transmission of updated data can continue in broadcast step 64 by retransmitting the same NPAsys 52 but with new SIDs 54 and instructions 56 (or other data) following each rebroadcast of NPAsys 52. Furthermore, controller 20 could send out first and second data frames 40, 50 as many times within a selected time frame as is necessary to ensure all of the cellular sets 34 operating within the service area of wireless system 10 receive the updated programming instructions and data.

Receiving by the Cellular Set

Figure 5:
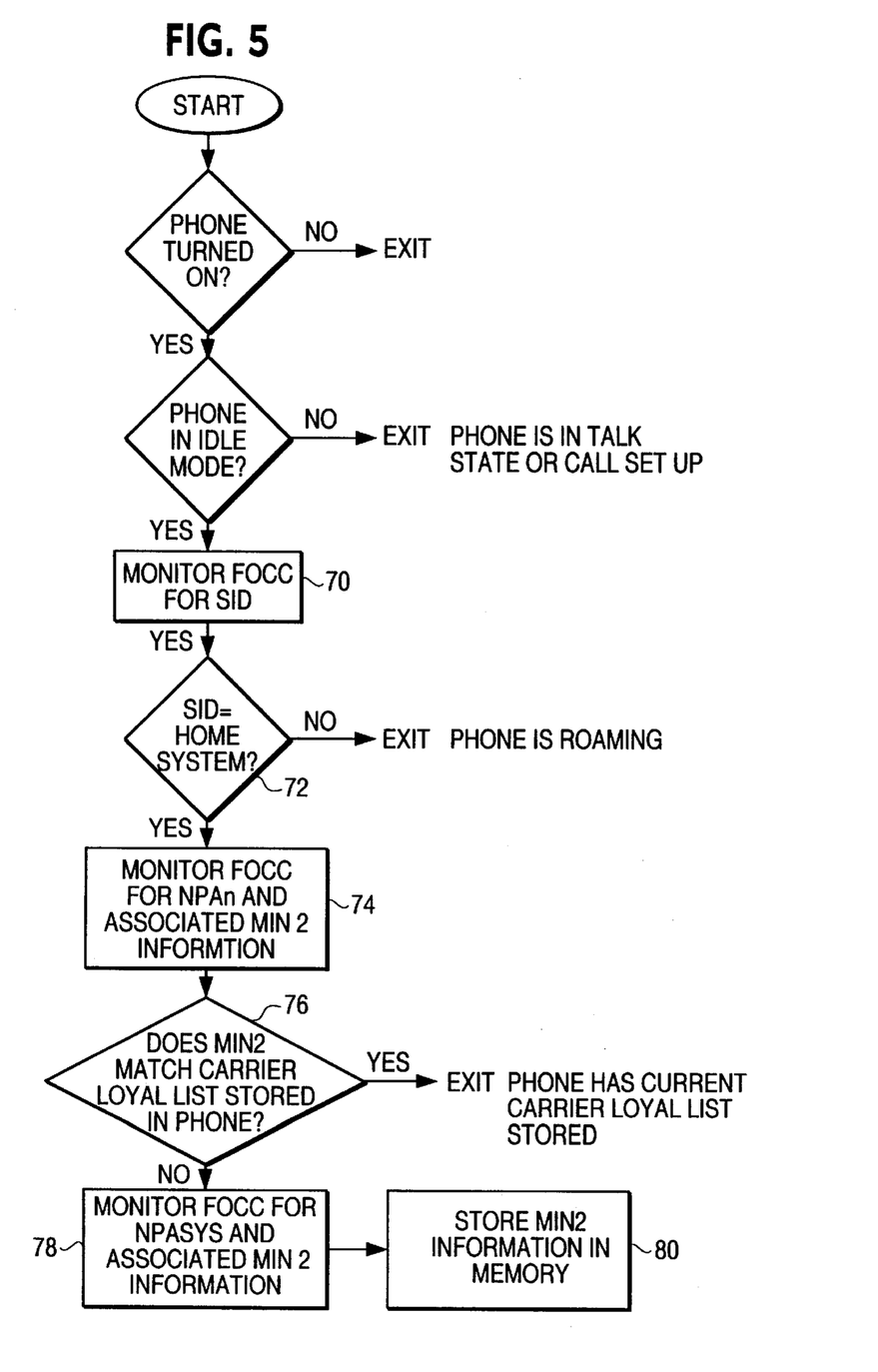
FIG. 5 is a flowchart showing, in block fashion, one process according to the present invention for operating a cellular set receiving and storing an updated carrier list.

While the cellular set 34 is powered up and in an appropriate mode, FIG. 5 shows that it performs monitoring step 70 in which the FOCC is monitored for an appropriate SID. When a SID is found, the cellular set performs a comparison step 72 in which the SID is analyzed to determine whether or not the cellular set 34 is in its home system. If the answer is no, the cellular set 34 may enter into a roaming state if a communication is later received or initiated.

Optionally, if the cellular set 34 is in its home system it will enter an acquisition mode and perform monitoring step 74 that scans the control channel for NPAn 44 and its associated MIN 2 information that is the carrier list number 42. Typically, the NPAn 44 will be broadcast in a MIN 1 location on the FOCC and will be accompanied by MIN 2 information in the format of XXX-XXXX, as described above and shown in FIG. 2, which may be the new carrier list number 42. Because the cellular set 34 may be programmed to recognize NPAn 42 as designating a carrier list number 42, in comparison step 76 it processes the MIN 2 information by, for instance, comparing the current carrier list number 42 with the stored carrier list number in its memory unit 39. If the comparison is a match, the current carrier list is already in memory 39 and no update is necessary; cellular set 34 accordingly exits the comparison step 76.

Otherwise, if comparison step 76 does not indicate a match, the cellular set 34 enters an acquisition mode. In data acquisition step 78 cellular set 34 monitors the control channel for NPAsys and associated MIN 2 information that may be the SID 54 and instruction 56 shown in FIG. 3. Once the MIN 2 information comes across the control channel, the cellular set 34 performs storage step 80 in order to store information (such as SIDs 54) in memory unit 39. Cellular set 34 may be programmed to continue in acquisition mode until occurrence of a trigger, such as passage of a preselected time period, receipt of a preselected number of SIDs 54 or receipt of a termination code in the MIN 2 space following NPAn 42.

Operation With Updated Carrier List

Figure 6:
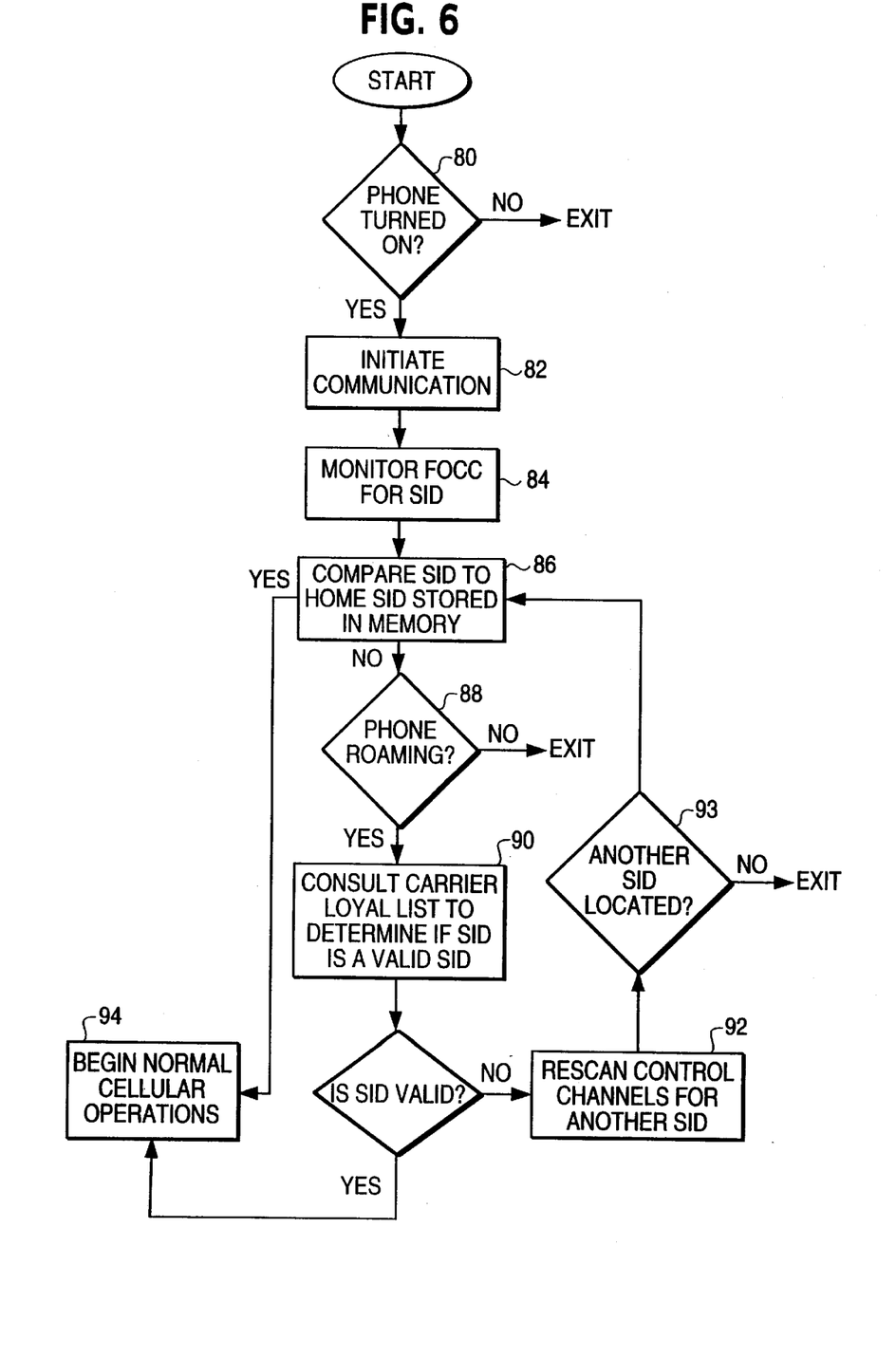
FIG. 6 is a flowchart showing, in block fashion, one process according to the present invention for operating the cellular set using the updated carrier list.

Cellular set 34 continues normal operations using its updated carrier list as shown in FIG. 6. Initiating (or receiving) a communication in step 82 causes the cellular set 34 to perform monitoring step 84 to monitor the control channel for a SID. After acquiring a SID, cellular set 34 performs compare step 86, comparing the acquired SID to the home SID stored in the cellular set 34. If a match occurs, normal cellular operation begins, as shown in step 94; otherwise, the cellular set 34 determines in step 88 whether roaming is appropriate. If roaming is not authorized, cellular set 34 immediately exits the procedure. (At this point, the user may override the programming of the cellular set 34 to allow it to proceed with roaming operations). If the cellular set 34 is allowed to roam, it performs consulting step 90 to determine if the acquired SID is on its updated carrier list. An acquired SID that is valid, e.g. located on the updated positive carrier list, results in commencing normal cellular operations in step 94. (Optionally, if the carrier list is a "negative" list, an acquired SID will be valid if it is not on the list; if the acquired SID is valid it triggers cellular operation in step 94).

If the acquired SID is not valid (i.e., either on a negative list or not on a positive list), the cellular set 34 enters into rescanning step 92 in which the control channels are rescanned for acquisition of a second SID. Cellular set 34 can optionally be programmed to execute step 93 that exits out of the rescanning step 92 if a second SID is not located. Acquisition of a second SID causes the cellular set 34 to cycle through steps 86, 88, and 90 and, depending on whether the second SID is valid, execute exit step 93 or cellular operations step 94.

As an example of the operation of a cellular set 34 provided with a positive carrier list, assume that a mobile user of the cellular set 34 utilizes BellSouth Mobility, Inc. ("BellSouth") as her home carrier and lives in Atlanta. The SID for BellSouth would be provided within the memory 39 of the cellular set 34. In Atlanta, BellSouth is a wireline carrier that has been assigned the B frequency band; however, in other markets, such as Los Angeles, BellSouth or an associated carrier may operate over the A frequency band. If the mobile user travels to Los Angeles and a carrier associated with BellSouth operates the A frequency band in Los Angeles, because it may be less expensive, the mobile user should use the associate carrier. However, the cellular set 34 typically is programmed to prefer operation on the frequency band in BellSouth's Atlanta service area, which in this case is the B frequency band. In Los Angeles, the B frequency band is operated by Carrier C, a carrier not associated with BellSouth.

To cause the cellular set 34 to operate on the frequency of the carrier associated with BellSouth, it may be provided with a positive carrier list that may contain a first SID that identifies BellSouth and a second SID that identifies its associated Los Angeles carrier. Thus, when in Los Angeles, the cellular set will acquire the SID of the carrier operating the B frequency band. Only if that SID matches one of the SIDs 54 on the carrier list will the cellular set 34 be allowed to proceed with a call. In this example, the acquired SID identifies Carrier C that is an unassociated foreign carrier whose SID would not match the SIDs 54 on the carrier list. Cellular set 34 would look for the SID of the carrier operating the A frequency band, which in this example would be the BellSouth associated carrier whose SID is included in the carrier list. Cellular set 34 would then be allowed to proceed with communication over the A frequency band. In short, while the customer is in Atlanta, her cellular set 34 will operate on the B frequency band assigned to BellSouth; conversely, when she travels to Los Angeles, her cellular set 34 will operate on the A frequency band assigned to an associate carrier of BellSouth.

If the associate carrier in Los Angeles loses its license or is acquired by another entity, it will be necessary to change the SIDs 54 within the cellular set 34. Likewise, such change would be appropriate if BellSouth acquired or reached a reciprocal service agreement with the foreign Carrier C. Thus, using the method described above, the carrier list is updated or refreshed without intervention by the mobile user.

Security within the wireless system 10 could be accomplished by coupling the controller 20 to the MSC 24 via the dedicated roamer access port 23. The roamer access port 23 would be dialed by the controller 20 when a new carrier list number 42 or new SIDs 54 are prepared for broadcast. By screening the first and second data frames 40, 50 so that they cannot be dialed by any other roamer access port, unauthorized transmissions of a current carrier list number 42, SIDs 54, instruction 56 or other data is prevented.

The method of the present invention can be used to send virtually any type of data, including new programming instructions, to any programmable cellular communications device. For example, the method may be used to reprogram or update the memory contents of pagers. Also the method may be used for reprogramming the data reporting devices disclosed in applicant's U.S. Pat. Nos. 5,526,401 and 5,546,444, titled "Methods and Apparatus for Communicating Data Via a Cellular Network Control Channel." Using the methods and apparatus described in applicant's above-referenced patents, signals confirming receipt of data updates or signals embodying data reports generated within the cellular set 34 may be forwarded from the cellular set 34 to the MSC 24 over the RECC.

The foregoing is provided for purposes of explanation and disclosure of a preferred embodiment of the present invention. Modifications and adaptations to the described embodiment will be apparent to those skilled in the art and may be made without departing from the scope or spirit of the invention and the following claims.

What is claimed is:

1. A method for simultaneously transmitting data updates, each comprising a program instruction, to a plurality of programmable cellular sets, each of which is capable of communicating over a wireless system comprising a plurality of cells, each cell comprising a control channel for communication with the cellular set, the method comprising:

broadcasting simultaneously to the plurality of programmable cellular sets the data updates over the control channel at a selected time;

monitoring the control channel with at least two cellular sets to recognize the data updates;

retrieving the data updates into each of the two cellular sets which are used to refresh operational data stored within a memory unit associated with each cellular set; and providing each cellular set with a stored list of system identification numbers ("SIDs") in memory and revising the stored list of SIDs according to the programming instruction.

2. The method of claim 1 further comprising monitoring communications traffic within the wireless system to determine the current communications traffic level.

3. The method of claim 3 in which monitoring the current communications traffic level comprises comparing the current communications traffic level with a preselected communications traffic threshold to determine whether to transmit data.

4. The method of claim 1 further comprising repeating the broadcasting, monitoring, retrieving and providing until the stored list is updated with all new SIDs.

5. The method of claim 4 further comprising operating at least one of the two cellular sets with the updated stored list.

6. The method of claim 1 in which broadcasting comprises:

coupling a controller to the wireless system;

sending the data updates from the controller to the cells within the wireless system; and instructing the cells to broadcast the data update over the control channels.

7. The method of claim 6 in which coupling comprises connecting the controller to a roamer access port of a Mobile Switching Center ("MSC") associated with the wireless system.

8. The method of claim 7 in which sending comprises programming the controller to dial the roamer access port, sending the data updates from the controller to the MSC and communicating the data updates from the MSC over communication links to the cells.

9. The method of claim 8 in which at least one of the data updates further comprises an unassigned telephone number as an identifier.

10. The method of claim 9 further comprising causing the two cellular sets to recognize the identifier and process the programming instruction in order to determine whether to continue monitoring the control channel to retrieve additional data updates.

11. A method for transmitting data updates simultaneously to a plurality of programmable cellular sets, each of which is capable of communicating over a wireless system comprising a plurality of cells, each cell comprising a control channel for communication with the cellular set, the method comprising:

broadcasting simultaneously to the plurality of programmable cellular sets the data updates at a selected time;

monitoring the control channel with at least two cellular sets to recognize the data updates;

retrieving the data updates into each of the two cellular sets which are used to refresh operational data stored within a memory unit associated with each cellular set; and wherein a first data update comprises a new version code and the method further comprises comparing at each of the two cellular sets the new version code with a stored version code and, if the new version code does not match the stored version code, acquiring a second update.

12. A method for transmitting a data frame comprising a unique identifier and a new version code to a cellular set capable of communication with a wireless network having a Mobile Switching Center ("MSC") and a plurality of geographically dispersed cells that communicate by transmitting information over a control channel to the cellular set, the method comprising:

sending the data frame from a controller to the MSC;

broadcasting at the MSC the data frame to the cells over the control channel;

identifying the data frame at the cellular set;

updating operational data stored in a memory within the cellular set by comparing the new version code with a stored version code at the cellular set and an acquiring another data frame if the new version code does not match the stored version code.

13. The method of claim 12 in which the other data frame comprises an unassigned NPA and a system identification number (SID) and the updating operational data further comprises updating a first carrier list stored within the memory to create an updated carrier list.

14. The method of claim 13 further comprising communicating with the cellular set using the updated carrier list.

15. The method of claim 14 in which the communicating comprises:

scanning the control channel to obtain a first SID that identifies a first wireless system capable of providing communication service to the cellular set;

determining whether the first SID is valid;

allowing communication between the cellular set and the wireless system identified by the first SID if the first SID is valid;

rescanning, in response to the determining indicating that the first SID is not valid, the control channel to locate a second SID identifying a second wireless system capable of providing communication service to the cellular set; and initiating communication with the second wireless system if the second SID is valid.

16. A method for simultaneously broadcasting a data frame comprising a new version code for refreshing operational data located within at least two cellular sets capable of communication with a wireless communication system comprising a plurality of geographically dispersed cells, each cell having a control channel for communicating with the cellular sets, the method comprising:

coupling a controller to the wireless system;

sending the data frame from the controller to the cells within the wireless system;

instructing the cells to broadcast the data frame over each cell's control channel; and comparing at each of the at least two cellular sets the new version code with a stored version code and, if the new version code does not match the stored version code, acquiring another data frame.

17. The method of claim 16 in which coupling comprises connecting the controller to a roamer access port of a Mobile Switching Center ("MSC") associated with the wireless system.

18. The method of claim 17 in which the two cellular sets each perform:

(a) scanning the control channel in order to locate the data frame; and (b) acquiring the data frame and storing the first data frame into a memory unit associated with the cellular set.

19. The method of claim 18 in which the two cellular sets each process the data frame and determine whether to trigger the cellular set into the acquisition mode to acquire the other data frame, wherein the processing comprises recognizing a first NPA.

20. The method of claim 19 in which the other data frame comprises (1) an identifier comprising a second, unassigned NPA and (2) a record field comprising a SID.

21. A method for programming a cellular set capable of communication over a control channel in a wireless system, and having a carrier list of System Identification Numbers (SIDs) and a stored version code stored for identifying the carrier list, the method comprising:

monitoring the control channel at the cellular set for a first data frame comprising a current version code;

receiving the first data frame at the cellular set;

comparing at the cellular set the current version code with the stored version code;

storing, in response to comparing, the the current version code;

scanning, in response to comparing the control chapel to acquire a second data frame comprising a SID; and adding the SID to the carrier list stored in memory.

22. The method of claim 21 further comprising determining whether the cellular set is served by its home carrier.

23. The method of claim 22 in which the monitoring is only performed if the determining indicates that the cellular set is served by its home carrier.

24. The method of claim 23 in which the SID associated with the second data frame is repeatedly changed and the second data frame is rebroadcast with each change, whereby an entire list of SIDs is broadcast so that the memory of the cellular set is provided with the current list of SIDS.

25. The method of claim 21 further comprising broadcasting the first and second data frames over the control channel, wherein the broadcasting is performed before the monitoring and comprises:

coupling a controller to a Mobile Switching Center ("MSC") associated with the wireless system;

communicating the first and second data frames from the controller to the MSC;

sending the first and second data frames from the MSC over communication links to a plurality of cells coupled to the cellular sets via the control channel; and instructing the cells to broadcast the first and second data frames over the control channel.

26. A communication system comprising:

a Mobile Switching Center ("MSC") coupled via communication links to a plurality of cells, each cell comprising means for communicating over a control channel;

a first and a second data frame each comprising a record field in which information is stored;

a controller, coupled to the MSC, programmed to send the first and second data frames to the MSC, which forwards the first and second data frames to the cells for broadcast over the control channel;

a plurality of cellular sets, each comprising a data receiver, a processor and a memory unit in which is stored operational data; and wherein the MSC transmits at least part of the first and second data frames in altered identifiers of the cellular sets, each cellular set monitors the control channel for the identifiers and, upon receiving the identifiers, each cellular set retrieves the information from the record fields and stores the information in the memory unit so as to update a list of SIDs.

27. The communication system of claim 26 further comprising a roamer access port associated with the MSC and dedicated to serving the controller.

28. A communication system comprising:

a Mobile Switching Center ("MSC") coupled via communication links to a plurality of cells, each cell comprising means for communicating over a control channel;

a first data frame comprising a record field in which information is stored, a controller, coupled to the MSC, programmed to send the first data frame to the MSC, which forwards the first data frame to the cells for broadcast over the control channel; and a plurality of cellular sets, each comprising a data receiver, a processor and a memory unit in which is stored operational data;

wherein the MSC transmits at least part of the first data frame in an altered identifier of the cellular sets, each cellular set monitors the control channel for the identifier and, upon receiving the identifier, retrieves the information from the record field and stores the information in the memory unit which is used to update the operational data and wherein the operational data comprises a list of SIDs.

29. The communication system of claim 28 in which the first data frame comprises a telephone number, the identifier comprises an unassigned NPA and the information in the record field comprises a SID to be added to the list.

30. A method for operating a programmable cellular set, initially provided with a number of System Identification Numbers ("SIDs") that collectively form a current SIDs list stored within the cellular set, which communicates over control channels to a plurality of cells coupled to and forming a wireless system, the method comprising:

broadcasting a data update comprising a new version code over a control channel;

retrieving the data update into the cellular set which is used to update the current SIDs list and thereby create an updated SIDs list;

comparing at the cellular set the new version code with a stored version code and, if the new version code does not match the stored version code then perform the broadcasting and retrieving of another data update to the SIDs list;

scanning the control channel to obtain a first SID that identifies a first wireless system;

comparing the first SID with the updated SIDs list to determine whether the first SID is valid;

allowing, if the first SID is valid, communication between the cellular set and the first wireless system;

rescanning, if the first SID is not valid, the control channel to locate a second SID identifying a second wireless system;

comparing the second SID with the updated SIDs list to determine whether the second SID is valid; and allowing, if the second SID is valid, communication with the second wireless system.

31. The method as set forth in claim 1, wherein broadcasting simultaneously comprises broadcasting the data update in an altered identifier of the cellular sets.

32. A cellular set for use in communicating in a cellular network with a Mobile Switching Center ("MSC") over a control channel, comprising:

a data receiver for receiving messages which include an update message from the MSC over the control channel;

a processor for controlling operations of the cellular set and for monitoring the signals received from the MSC over the control channel for messages containing an identifier for the cellular set;

a memory unit for storing a carrier list of System Identification Numbers ("SIDs") associated with the cellular set; and wherein the processor also monitors the signals received from the MSC over the control channel for the update message containing an altered identifier of the cellular set and a new version code, the processor revising the carrier list stored in the memory unit when the new version code does not match a stored version code and wherein the carrier list is revised by another update message.

33. The system as set forth in claim 32, further comprising a transmitter for transmitting voice communications to the MSC.

34. The system as set forth in claim 32, wherein the altered identified comprises an altered mobile identification number of the cellular set.

* * * * *